United States Patent
Han et al.

(10) Patent No.: US 11,349,525 B2
(45) Date of Patent: May 31, 2022

(54) DOUBLE TALK DETECTION METHOD, DOUBLE TALK DETECTION APPARATUS AND ECHO CANCELLATION SYSTEM

(71) Applicant: SHENZHEN GOODIX TECHNOLOGY CO., LTD., Shenzhen (CN)

(72) Inventors: Wenkai Han, Shenzhen (CN); Guoliang Li, Shenzhen (CN); Xinshan Wang, Shenzhen (CN); Hongjing Guo, Shenzhen (CN); Hu Zhu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/031,862

(22) Filed: Sep. 24, 2020

(65) Prior Publication Data

US 2021/0013927 A1 Jan. 14, 2021

Related U.S. Application Data

(63) Continuation of application No. PCT/CN2019/087907, filed on May 22, 2019.

(51) Int. Cl.
*H04B 3/32* (2006.01)
*H04M 9/08* (2006.01)
*H04M 3/22* (2006.01)

(52) U.S. Cl.
CPC ............... *H04B 3/32* (2013.01); *H04M 3/22* (2013.01); *H04M 9/08* (2013.01); *H04M 9/082* (2013.01)

(58) Field of Classification Search
CPC combination set(s) only.
See application file for complete search history.

(56) References Cited

U.S. PATENT DOCUMENTS 6,192,126 B1   2/2001 Koski
10,115,411 B1  10/2018 Chu et al.
(Continued)

FOREIGN PATENT DOCUMENTS

CN   101106405     1/2008
CN   101179294 A   5/2008
(Continued)

OTHER PUBLICATIONS

Hanbo Bao et al: "A robust algorithm of double talk detection based on voice activity detection", Audio Language and Image Processing (ICALIP), 2010 International Conference on, IEEE, Piscataway, NJ, USA, Nov. 23, 2010 (Nov. 23, 2010), pp. 12-15, XP031847432, ISBN: 978-1-4244-5856-1.

*Primary Examiner* — Lisa Hashem
(74) *Attorney, Agent, or Firm* — Emerson, Thomson & Bennett, LLC; Roger D. Emerson; Warren A. Rosborough

(57) ABSTRACT

A double talk detection method, a double talk detection apparatus and an echo cancellation system are provided. The double talk detection method comprises: determining, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal. The double talk detection method avoids missing detection and false detection, improves the accuracy of double talk detection, cancels the echo in the near-end voice signal thoroughly when applied in the field of echo cancellation, and improves the communication experience of both talk parties.

20 Claims, 4 Drawing Sheets

(56) References Cited

U.S. PATENT DOCUMENTS

| | | | | |
|---|---|---|---|---|
| 2011/0019833 A1* | 1/2011 | Kuech | ................... | H04M 9/082 |
| | | | | 381/66 |
| 2014/0098950 A1 | 4/2014 | Chu et al. | | |
| 2015/0011266 A1* | 1/2015 | Feldt | ................... | H04M 9/082 |
| | | | | 455/570 |
| 2019/0104360 A1* | 4/2019 | Bou Daher | ............ | H04R 3/005 |
| 2021/0099201 A1* | 4/2021 | Winick | ................... | H04B 3/32 |
| 2021/0176579 A1* | 6/2021 | Laitinen | ................... | H04S 3/008 |
| 2021/0264935 A1* | 8/2021 | Wu | ..................... | G10L 21/0232 |

FOREIGN PATENT DOCUMENTS

| | | |
|---|---|---|
| CN | 101179635 A | 5/2008 |
| CN | 101964670 | 2/2011 |
| CN | 102984406 A | 3/2013 |
| CN | 103325379 | 9/2013 |
| CN | 103718538 | 4/2014 |
| CN | 105391879 | 3/2016 |
| CN | 109068012 A | 12/2018 |
| CN | 109215672 | 1/2019 |
| CN | 109348072 A | 2/2019 |
| WO | 0072557 A2 | 11/2000 |

\* cited by examiner

DOUBLE TALK DETECTION METHOD, DOUBLE TALK DETECTION APPARATUS AND ECHO CANCELLATION SYSTEM

CROSS REFERENCE TO RELATED APPLICATIONS

This application is a continuation of International Application No. PCT/CN2019/087907, filed on May 22, 2019, and entitled "DOUBLE TALK DETECTION METHOD, DOUBLE TALK DETECTION APPARATUS AND ECHO CANCELLATION SYSTEM", the entire contents of which are herein incorporated by reference.

TECHNICAL FIELD

Embodiments of the present disclosure relate to the field of signal processing technology, and specifically to a double talk detection method, a double talk detection apparatus and an echo cancellation system.

BACKGROUND

Echo cancellation is currently a major problem in the industry. From the ways of echo generation, echo caused by network transmission delay is also included in addition to echo generated by environmental causes, for example, echo generated because of sound feedback of a speaker to a microphone in a hands-free communication system. Moreover, indirect echo generated after single or multiple reflections of far-end sound is also included. From the influencing factors of echo cancellation, it is not only related to the external environment of a terminal device of the communication system, but also closely related to the performance of a host running the communication system and network conditions. The external environment may specifically include: the relative distance and direction between the microphone and the speaker, the relative distance and direction between the speakers, the size of a room, the material of the wall of the room, etc.

The presence of echo will affect the clarity of voice, so the quality of voice communication is improved by means of acoustic echo cancellation (AEC). The AEC simulates an echo path by using an adaptive filter, and continuously adjusts a coefficient of the filter through an adaptive algorithm, such that its impulse response approaches the true echo path. Then, an estimated echo signal is obtained in combination with a far-end voice signal and the filter. Next, the estimated echo signal is subtracted from an input signal of the microphone, so as to achieve the purpose of echo cancellation.

However, the presence of a near-end speaker's voice signal will diverge the coefficient of the filter, thereby affecting the effect of echo cancellation. Accordingly, double talk detection (DTD) is required in the echo cancellation algorithm of the prior art. The so-called double talk means that a signal acquired by the microphone includes not only an echo caused by a far-end voice signal, but also a near-end speaker's voice signal.

In the existing double talk detection solutions, missing detection and false detection often occur, resulting in low detection accuracy. If missing detection occurs, the coefficient of the adaptive filter will diverge subsequently; and if false detection occurs, the single talk (ST) will be mistakenly processed as a double talk (DT), which will slow down or even stop the update of the coefficient of the adaptive filter, resulting in a large residual echo in the voice signal output by the echo cancellation algorithm to affect the communication experience of both talk parties.

SUMMARY

In view of this, one of the technical problems to be solved by the embodiments of the present disclosure is to provide a double talk detection method, a double talk detection apparatus and an echo cancellation system to overcome the above defects of the prior art.

An embodiment of the present disclosure provides a double talk detection method, including: determining, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal.

An embodiment of the present disclosure provides a double talk detection apparatus, including: a double talk detector configured to determine, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal.

An embodiment of the present disclosure provides an echo cancellation system, including a double talk detection apparatus and an adaptive filter, the double talk detection apparatus including a double talk detector configured to determine, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal.

According to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal is determined in the embodiments of the present disclosure. It can thus be seen that, based on the energy ratio and the frequency coherence value at the same time, missing detection and false detection are avoided, and the accuracy of double talk detection is improved. When applied in the field of echo cancellation, the echo in the near-end voice signal is cancelled thoroughly, and the communication experience of both talk parties is improved.

BRIEF DESCRIPTION OF THE DRAWINGS

Some specific embodiments of the present disclosure are described in detail hereinafter in an exemplary manner instead of a non-limitative manner with reference to the accompanying drawings. In the drawings, like reference numerals denote like or similar parts or elements. A person skilled in the art should understand that these drawings are drawn to scale. In the figures.

DETAILED DESCRIPTION

The implementation of any technical solution of the embodiments of the present disclosure does not necessarily achieve all the above advantages at the same time.

The following further describes specific implementations of the embodiments of the present disclosure with reference to the accompanying drawings.

According to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal is determined in the embodiments of the present disclosure. It can thus be seen that, based on the energy ratio and the frequency coherence value at the same time, missing detection and false detection are avoided, and the accuracy of double talk detection is improved. When applied in the field of echo cancellation, the echo in the near-end voice signal is cancelled thoroughly, and the communication experience of both talk parties is improved. In addition, a double talk detection module has only a technical relationship with the near-end digital voice signal y(n) and the far-end digital voice signal x(n), but has no connection with an adaptive filter. Therefore, the double talk detection solutions of the embodiments of the present disclosure are, in fact, not limited to echo cancellation application scenarios, but can also be applied to other scenarios.

Figure 1:
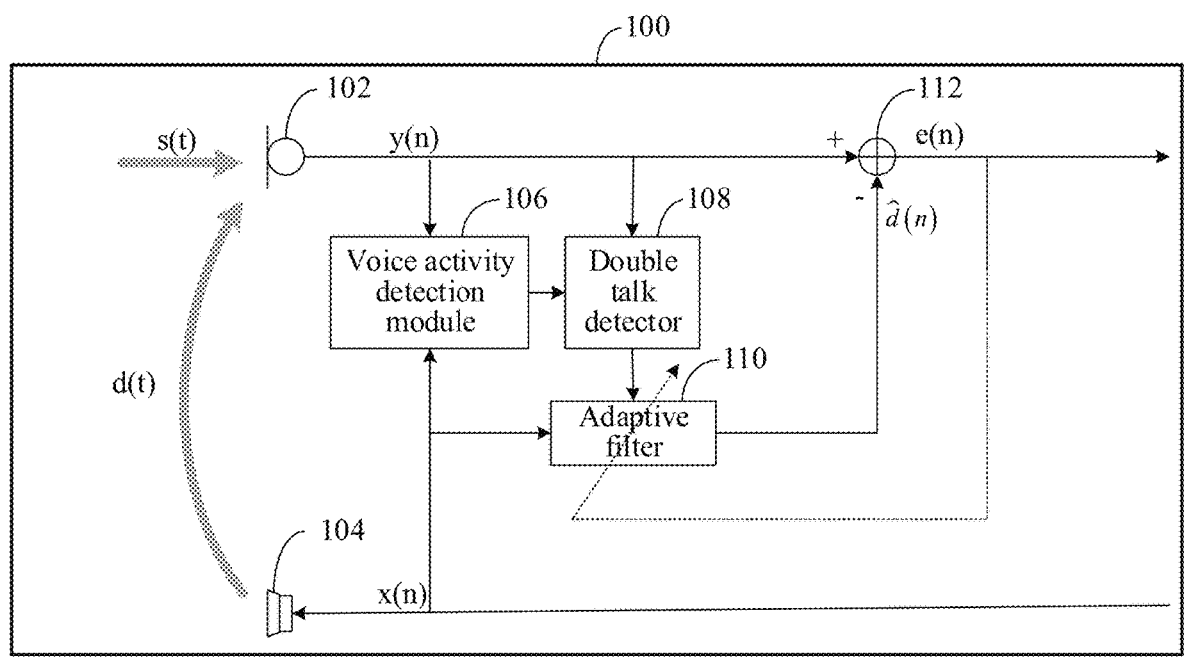
FIG. 1 is a schematic structural diagram of an echo cancellation system according to Embodiment 1 of the present disclosure.

FIG. 1 is a schematic structural diagram of an echo cancellation system according to Embodiment 1 of the present disclosure. As shown in FIG. 1, the echo cancellation system 100 specifically includes a voice activity detection module 106, a double talk detector 108, and an adaptive filter 110. In addition, the echo cancellation system may further include: a voice acquisition module 102, a voice playing module 104, and an addition module 112. The voice acquisition module 102 is communicatively connected with the voice activity detection module 106, the double talk detector 108, and the addition module 112, respectively. The voice playing module 104 is communicatively connected with the voice activity detection module 106 and the adaptive filter 110 respectively. The voice activity detection module 106 is communicatively connected with the double talk detector 108. The double talk detector 108 is communicatively connected with the adaptive filter 110 and the addition module 112 respectively.

The voice acquisition module 102 is configured to acquire a near-end analog voice signal y(t) to generate the near-end digital voice signal y(n). In this embodiment, the voice acquisition module may specifically be a microphone. The near-end analog voice signal y(t) acquired may include a near-end speaker's voice signal s(t), and may also include an echo analog voice signal d(t) caused when the voice playing module 104 plays a far-end analog voice signal.

The voice playing module 104 is configured to play the far-end analog voice signal corresponding to the received far-end digital voice signal x(n). In this embodiment, the voice playing module 104 may specifically be a speaker.

The voice activity detection module 106 is configured to detect whether an echo digital voice signal d(n) is present in the near-end digital voice signal y(n). In this embodiment, the voice activity detection module 106 may also be referred to as a voice activity detector (VAD).

If the echo digital voice signal d(n) is present in the near-end digital voice signal y(n), the double talk detector is activated to determine whether a near-end speaker's digital voice signal s(n) is present in the near-end digital voice signal y(n) according to an energy ratio between the far-end digital voice signal x(n) and the near-end digital voice signal y(n), and a frequency coherence value between the near-end digital voice signal y(n) and the far-end digital voice signal x(n), so as to control the update of a filter coefficient.

The adaptive filter 110 is configured to generate an estimated echo digital voice signal $\hat{d}(n)$ according to the filter coefficient and the far-end digital voice signal x(n) to cancel the echo digital voice signal d(n) present in the near-end digital voice signal y(n). In this embodiment, the adaptive filter 110 is, for example, a multi-delay block frequency domain adaptive filter.

The addition module 112 is configured to obtain an error digital voice signal e(n) by subtracting the estimated echo digital voice signal $\hat{d}(n)$ from the near-end digital voice signal y(n), so as to cancel the echo digital voice signal d(n) present in the near-end digital voice signal y(n). In this embodiment, the addition module 112 may specifically be an adder. If the estimated echo digital voice signal $\hat{d}(n)$ is more accurate, i.e., closer to the actual echo digital voice signal d(n), the clarity of voice is higher.

Further, in this embodiment, the voice activity detection module 106 is configured to detect, according to power corresponding to the far-end digital voice signal x(n) and power corresponding to the near-end digital voice signal y(n), whether the echo digital voice signal d(n) is present in the near-end digital voice signal y(n). For example, if the power of the near-end digital voice signal y(n) and the power of the far-end digital voice signal x(n) are both greater than corresponding preset thresholds, it is determined that the echo digital voice signal d(n) is present in the near-end digital voice signal y(n).

Further, in this embodiment, if the echo digital voice signal d(n) is actually not present in the near-end digital voice signal y(n), the double talk detector 108 is not activated, such that the filter coefficient is updated according to the historical step size.

In this embodiment, it can be seen from FIG. 1 that the double talk detection module has only a technical relationship with the near-end digital voice signal y(n) and the far-end digital voice signal x(n), but has no connection with the estimated echo digital voice signal $\hat{d}(n)$ and the error digital voice signal e(n), so decoupling of the double talk detection module and the adaptive filter is achieved.

The working principle of echo cancellation is exemplified below in conjunction with an embodiment of an echo cancellation method.

Figure 2:
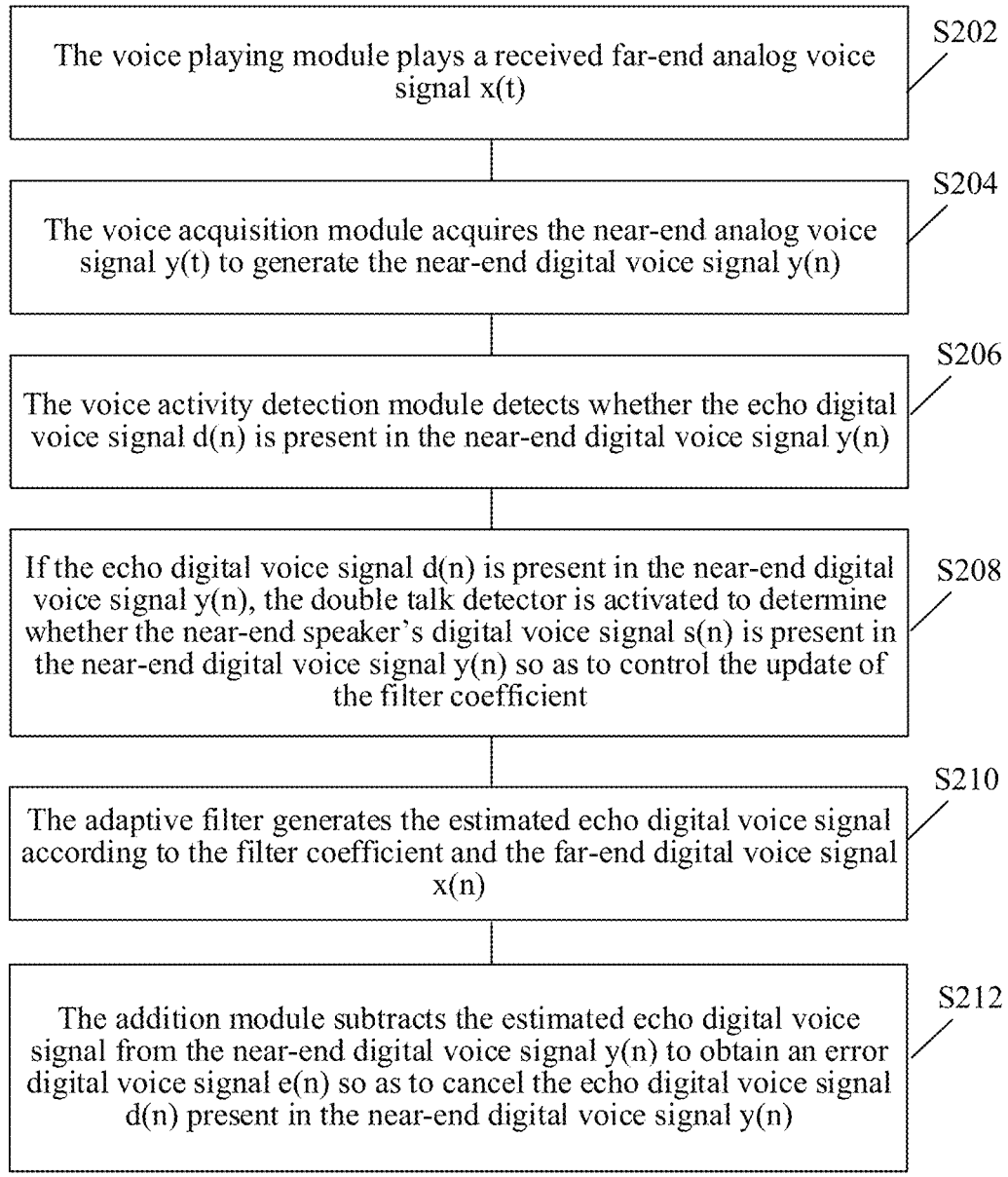
FIG. 2 is a schematic workflow diagram of echo cancellation by the echo cancellation system according to Embodiment 2 of the present disclosure.

FIG. 2 is a schematic workflow diagram of echo cancellation by the echo cancellation system according to Embodiment 2 of the present disclosure. Corresponding to FIG. 1 above, the workflow includes the following steps S202 to S212.

S202, the voice playing module plays a received far-end analog voice signal x(t);

In this embodiment, the echo analog voice signal d(t) included in the near-end analog voice signal y(t) is specifically caused by the far-end analog voice signal x(t). Therefore, the near-end analog voice signal y(t) input by the voice acquisition module 102 may include the speaker's analog voice signal s(t) and the echo analog voice signal d(t). It should be noted here that the far-end analog voice signal x(t) is played if it exists, or else playback is skipped.

S204, the voice acquisition module acquires the near-end analog voice signal y(t) to generate the near-end digital voice signal y(n);

S206, the voice activity detection module detects whether the echo digital voice signal d(n) is present in the near-end digital voice signal y(n);

In this embodiment, as mentioned above, if the voice activity detection module 106 is a VAD, it can specifically detect the far-end digital voice signal x(n) and the near-end digital voice signal y(n) by a short-time energy method, a time-domain average zero-crossing rate method, a short-time correlation method, etc., and then determine whether the echo digital voice signal d(n) is present. Further, if the short-time energy method is adopted, the voice activity detection module may detect, according to the power corresponding to the far-end digital voice signal x(n) and the power corresponding to the near-end digital voice signal y(n), whether the echo digital voice signal d(n) is present in the near-end digital voice signal y(n). For example, if the power of the near-end digital voice signal y(n) and the power of the far-end digital voice signal x(n) are both greater than corresponding preset thresholds, it is determined that the echo digital voice signal d(n) is present in the near-end digital voice signal y(n). Because the echo digital voice signal d(n) is generated due to the far-end digital voice signal x(n), it can be understood as when the far-end digital voice signal x(n) is present, the echo digital voice signal d(n) is also present, referring to the following formula (1) for a more intuitive view.

$$VAD = \begin{cases} 1 & \text{if } x(n) \neq 0 \\ 0 & \text{other cases} \end{cases} \quad (1)$$

In the above formula (1), VAD represents an output signal of the voice activity detection module. The value of the output signal VAD is 1, which means that the echo digital voice signal d(n) is present in the near-end digital voice signal y(n), Otherwise, in other cases, the value of the output signal VAD is 0, which means that the echo digital voice signal d(n) is actually not present in the near-end digital voice signal y(n).

S208, if the echo digital voice signal d(n) is present in the near-end digital voice signal y(n), the double talk detector is activated to determine whether the near-end speaker's digital voice signal s(n) is present in the near-end digital voice signal y(n) so as to control the update of the filter coefficient;

In this embodiment, the double talk detector is further configured to determine whether the near-end speaker's digital voice signal s(n) is present in the near-end digital voice signal y(n) according to an energy ratio between the far-end digital voice signal x(n) and the near-end digital voice signal y(n), and a frequency coherence value between the near-end digital voice signal y(n) and the far-end digital voice signal x(n).

In this embodiment, as mentioned above, if the echo digital voice signal d(n) is actually not present in the near-end digital voice signal y(n), the double talk detector is not activated, such that the filter coefficient is updated according to the historical step size. For example, when echo cancellation is performed in units of frames, the filter coefficient can be updated according to the update step size of the near-end digital voice signal of the previous frame. If the echo digital voice signal d(n) is present in the near-end digital voice signal y(n), the double talk detector is activated to determine whether the near-end speaker's digital voice signal s(n) is present in the near-end digital voice signal y(n).

Specifically, in this embodiment, if both the near-end speaker's digital voice signal s(n) and the echo digital voice signal d(n) are simultaneously present in the near-end digital voice signal y(n), the update step size of the filter coefficient is reduced, and the update of the filter coefficient is controlled to be slowed down, or the update of the filter coefficient is directly stopped. The reason why the update of the filter coefficient is slowed down or even stopped mainly considers that the presence of the near-end speaker's digital voice signal s(n) will diverge the filter coefficient, and an accurately estimated echo digital voice signal $\hat{d}(n)$ cannot be generated, thereby affecting the effectiveness of echo cancellation. If the near-end speaker's digital voice signal s(n) is not present but the echo digital voice signal d(n) is present in the near-end digital voice signal y(n), the update step size is increased to update the filter coefficient.

Here, as mentioned above, a separate update step size determination module can be added between the double talk detector and the adaptive filter, and is specifically configured to calculate the update step size, or the double talk detector can also calculate the update step size.

S210, the adaptive filter generates the estimated echo digital voice signal according to the filter coefficient and the far-end digital voice signal x(n);

In this embodiment, as mentioned above, the adaptive filter 110 is a multi-delay block frequency domain adaptive filter, i.e., includes a plurality of block adaptive filters, for example, the number of adaptive filter blocks is D, thereby achieving shorter block delay, faster convergence speed and smaller storage requirement.

S212, the addition module subtracts the estimated echo digital voice signal from the near-end digital voice signal y(n) to obtain an error digital voice signal e(n) so as to cancel the echo digital voice signal d(n) present in the near-end digital voice signal y(n).

In the specific application of the above echo cancellation scheme, the near-end digital voice signal, the far-end digital voice signal, and the echo digital voice signal are processed in units of frames, i.e., frames are divided with reference to the number M of frequency points of the adaptive filter, that is, every M data points in the echo digital voice signal d(n), the near-end speaker's digital voice signal s(n), and the near-end digital voice signal y(n) are denoted as 1 frame. The echo cancellation scheme is applied to each frame in the echo digital voice signal d(n), the near-end speaker's digital voice signal s(n), and the near-end digital voice signal y(n). Correspondingly, the double talk detection is substantially performed for each frame in the echo digital voice signal d(n), the near-end speaker's digital voice signal s(n), and the near-end digital voice signal y(n).

As mentioned above, the situation that the echo digital voice signal d(n) is present can be specifically divided into:

(1) The near-end speaker's digital voice signal s(n) is not present but only the echo digital voice signal d(n) is present, which is also referred to as single-end talk (or single talk);

(2) Both the near-end speaker's digital voice signal s(n) and the echo digital voice signal d(n) are present, which is also referred to as double-end talk (or double talk).

In the following embodiments, the description will focus on how a double talk detection apparatus implements double talk detection as an example.

Figure 3:
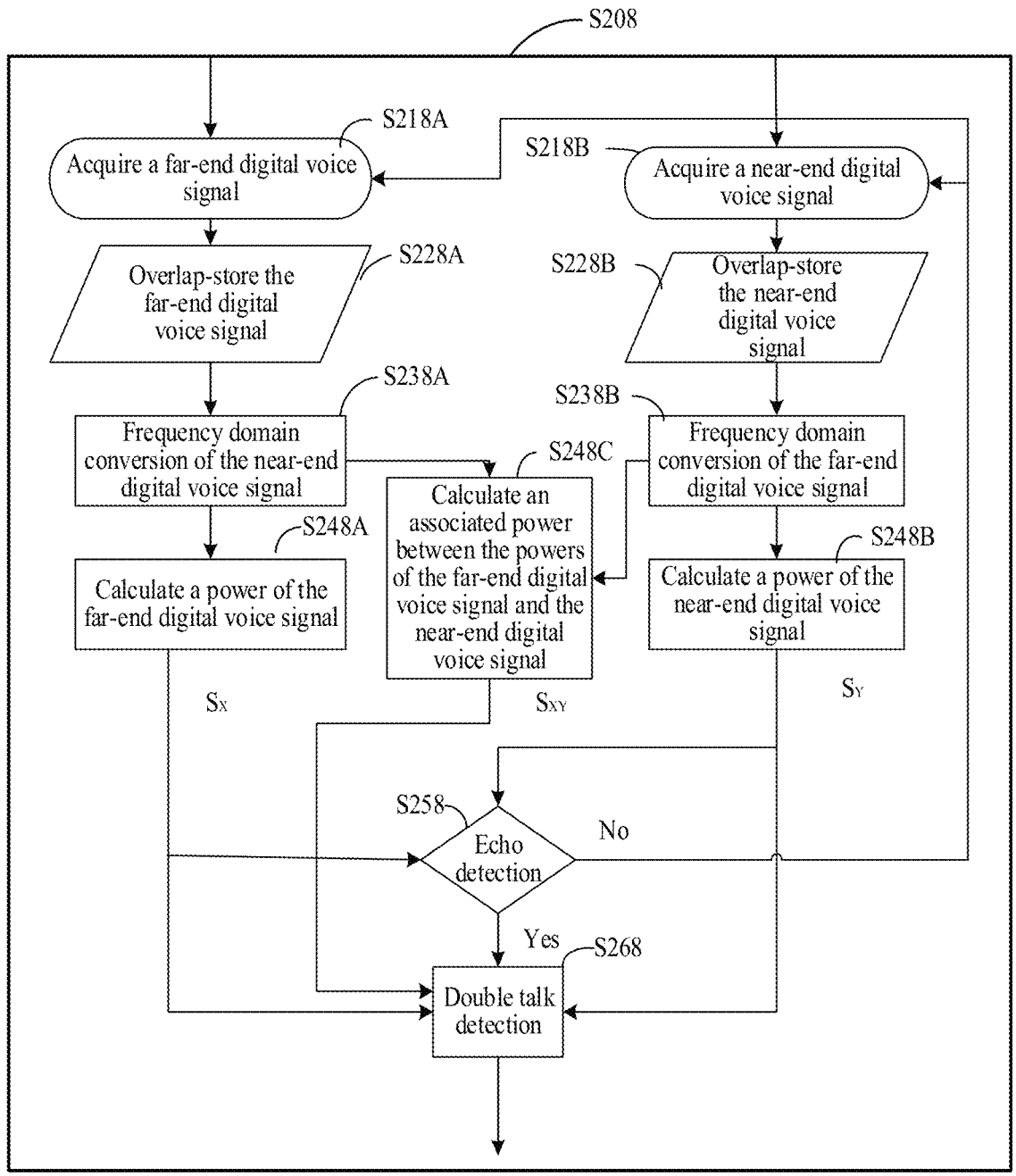
FIG. 3 is a schematic flowchart of a double talk detection method according to Embodiment 3 of the present disclosure.

FIG. 3 is a schematic flowchart of a double talk detection method according to Embodiment 3 of the present disclosure. As shown in FIG. 3, the method includes the following steps S218A to S268.

S218A, acquisition of a far-end digital voice signal;

In this embodiment, step S218A is specifically: an i-th frame of the far-end digital voice signal x(n) is acquired;

S218B, acquisition of a near-end digital voice signal;

In this embodiment, step S218B is specifically: an i-th frame of the near-end digital voice signal y(n) is acquired;

In this embodiment, an analog-to-digital converter performs analog-to-digital conversion on a far-end analog voice signal x(t) to obtain the far-end digital voice signal x(n), performs analog-to-digital conversion on a near-end analog voice signal y(t) to obtain the near-end digital voice signal y(n), and directly sends the same to the double talk detection apparatus.

As mentioned above, if frames are divided with reference to the number M of frequency points of the adaptive filter, that is, every M data points in the echo digital voice signal d(n), the near-end speaker's digital voice signal s(n), and the near-end digital voice signal y(n) are denoted as 1 frame, and the double talk detection is substantially performed for each frame of the near-end speaker's digital voice signal s(n) and the near-end digital voice signal y(n), or, in other words, the double talk detection scheme is applied in units of frames.

Therefore, in steps S218A and S218B, if the current time is for the i-th frame of the far-end digital voice signal x(n) and the i-th frame of the near-end digital voice signal y(n), the i-th frame of the far-end digital voice signal x(n) and the i-th frame of the near-end digital voice signal y(n) can be acquired specifically from the analog-to-digital converter by using the double talk detection scheme, that is, whether the near-end speaker's digital voice signal is present in the i-th frame of the near-end digital voice signal y(n) is finally determined through a subsequent step.

S228A, overlap-storage of the far-end digital voice signal

In this embodiment, step S228A is specifically: the i-th frame and (i−1)th frame of the acquired far-end digital voice signal x(n) are overlap-stored in the time domain;

S228B, overlap-storage of the near-end digital voice signal

In this embodiment, step S228B is specifically: the i-th frame and (i−1)th frame of the acquired near-end digital voice signal y(n) are overlap-stored in the time domain;

In this embodiment, when the above echo cancellation scheme is applied in the frequency domain, especially considering that the subsequent adaptive filter is a frequency domain adaptive filter, each frame of the far-end digital voice signal x(n) corresponds to a frequency domain signal, and each frame of the near-end digital voice signal y(n) corresponds to a frequency domain signal. In this embodiment, in the subsequent steps, the processing of calculating power may also be in the frequency domain. The distribution of signal power in the frequency domain can be obtained by calculating the power, and the change relationship of the signal power with the frequency can be acquired. In order to reduce resource consumption, the i-th frames and (i−1)th frames of the acquired far-end digital voice signal x(n) are overlap-stored in the time domain in steps S228A and S228B, and are subsequently converted over the frequency domain to obtain corresponding frequency domain signals in steps S238A and S238B.

S238A, frequency domain conversion of the near-end digital voice signal

In this embodiment, step S238A is specifically: a frequency domain conversion module converts the overlap-stored i-th frame and (i−1)th frame of the near-end digital voice signal y(n) into a corresponding frequency domain signal;

S238B, frequency domain conversion of the far-end digital voice signal

In this embodiment, step S238B is specifically: the frequency domain conversion module converts the i-th frame and (i−1)th frame of the far-end digital voice signal x(n) into a corresponding frequency domain signal;

In this embodiment, through discrete Fourier transform, the i-th frame and (i−1)th frame overlap-stored in the time domain in the near-end digital voice signal y(n) are converted into a corresponding frequency domain signal, and the i-th frame and (i−1)th frame overlap-stored in the time domain in the far-end digital voice signal x(n) are converted into a corresponding frequency domain signal. Specifically, the specific processing of time domain to frequency domain conversion by the frequency domain conversion module is shown in formula (2).

$$X(i) = F \begin{bmatrix} x(i-1) \\ x(i) \end{bmatrix}$$

$$Y(i) = F \begin{bmatrix} y(i-1) \\ y(i) \end{bmatrix}$$

(2)

In the above formula (2), i is more than or equal to 1;

The i-th frame of the far-end digital voice signal x(n) is denoted as x(i)

$$x(i)=[x((i-1)M) \ldots x(iM-1)]^T;$$

The (i−1)th frame of the far-end digital voice signal x(n) is denoted as x(i−1)

$$x(i-1)=[x(((i-1)-1)M) \ldots x((i-1)M-1)]^T$$

The i-th frame of the near-end digital voice signal y(n) is denoted as y(i)

$$y(i)=[y((i-1)M) \ldots y(iM-1)]^T;$$

The (i−1)th frame of the near-end digital voice signal y(n) is denoted as y(i−1)

$$y(i-1)=[y(((i-1)-1)M) \ldots y((i-1)M-1)]^T$$

F is a discrete Fourier transform matrix, and its dimension is 2M×2M;

X(i) is the frequency domain signal corresponding to the i-th frame and (i−1)th frame overlap-stored in the time domain in the far-end digital voice signal x(n);

Y(i) is the frequency domain signal corresponding to the i-th frame and (i−1)th frame overlap-stored in the time domain in the near-end digital voice signal y(n).

It can be seen from the above formula (2) that, considering the application scenario of echo cancellation, in order to realize subsequent fast convolution operation of the adaptive filter, the i-th frame and (i−1)th frame of the signal are overlap-stored in the time domain to reduce resource consumption.

S248A, calculation of power of the far-end digital voice signal

In this embodiment, step S248A is specifically: a power calculation module calculates the power of the frequency domain signal corresponding to the overlap-stored i-th frame and (i−1)th frame of the far-end digital voice signal x(n). In fact, for those of ordinary skill in the art, in view of the overall technical solution, the power here can be obtained from a power spectrum, or the power corresponding to the frequency point can be obtained by means of lookup.

S248B, calculation of power of the near-end digital voice signal

In this embodiment, step S248B is specifically: the power calculation module calculates the power of the frequency domain signal corresponding to the overlap-stored i-th frame and (i−1)th frame of the near-end digital voice signal y(n);

S248C, calculation of associated power between the power of the far-end digital voice signal and the power of the near-end digital voice signal;

In this embodiment, step S248C is specifically: the power calculation module calculates the associated power between the frequency domain signal corresponding to the overlap-stored i-th frame and (i−1)th frame of the far-end digital voice signal x(n) and the frequency domain signal corresponding to the overlap-stored i-th frame and (i−1)th frame of the near-end digital voice signal y(n);

In this embodiment, the above steps S248A, S248B, and S248C are specifically executed by the power calculation module, and the detailed calculations of the power in the steps S248A, S248B, and S248C are shown in the following formula (3).

$$S_{X_i} = \lambda S_{X_{i-1}} + (1-\lambda)(X(i) \circ X^*(i))$$

$$S_{Y_i} = \lambda S_{Y_{i-1}} + (1-Y)(Y(i) \circ Y^*(i))$$

$$S_{X_iY_i} = \lambda S_{X_{i-1}Y_{i-1}} + (1-\lambda(X(i) \circ Y^*(i)) \quad (3)$$

In the above formula (3), i is more than or equal to 2:

The power of the frequency domain signal corresponding to the overlap-stored i-th frame and (i−1)th frame of the far-end digital voice signal x(n) is denoted as $S_{X_i}$;

The power of the frequency domain signal corresponding to the overlap-stored i-th frame and (i−1)th frame of the near-end digital voice signal y(n) is denoted as $S_{Y_i}$;

The associated power between the frequency domain signal corresponding to the overlap-stored i-th frame and (i−1)th frame of the far-end digital voice signal x(n) and the frequency domain signal corresponding to the overlap-stored i-th frame and (i−1)th frame of the near-end digital voice signal y(n) is denoted as $S_{X_iY_i}$;

The power of the frequency domain signal corresponding to the overlap-stored (i−1)th frame and (i−2)th frame of the far-end digital voice signal x(n) is denoted as $S_{X_{i-1}}$;

The power of the frequency domain signal corresponding to the overlap-stored (i−1)th frame and (i−2)th frame of the near-end digital voice signal y(n) is denoted as $S_{Y_{i-1}}$;

The associated power between the frequency domain signal corresponding to the overlap-stored (i−1)th frame and (i−2)th frame of the far-end digital voice signal x(n) and the frequency domain signal corresponding to the overlap-stored (i−1)th frame and (i−2)th frame of the near-end digital voice signal y(n) is denoted as $S_{X_{i-1}Y_{i-1}}$;

λ is a smoothing parameter, different values are selected according to different application scenarios to prevent sudden changes of the associated power between two consecutive frames of the far-end digital voice signal x(n) and the near-end digital voice signal y(n), and the magnitude of the corresponding smoothing parameter is set based on empirical values according to different application scenarios. The smoothing parameters set for the power $S_{Y_i}$, the power $S_{X_i}$ and the associated power $S_{X_iY_i}$ respectively can be referred as a first smoothing parameter, a second smoothing parameter and a third smoothing parameter. If the values of the three smoothing parameters are exactly the same, they are uniformly referred to as a smoothing parameter.

"∘" represents a product of matrix elements, and "*" represents a complex conjugate.

Specifically, for example, when i=2, the above formula (3) is specifically:

$$S_{X_2} = \lambda S_{X_1} + (1-\lambda)(X(2) \circ X^*(2))$$

$$S_{Y_2} = \lambda S_{Y_1} + (1-\lambda)(Y(2) \circ Y^*(2)$$

$$S_{X_2Y_2} = \lambda S_{X_1Y_1} + (1-\lambda)(X(2) \circ Y^*(2))$$

$$S_{X_1} = (X(1) \circ X^*(1))$$

$$S_{Y_1} = (Y(1) \circ Y^*(1))$$

$$S_{X_1Y_1} = (X(1) \circ Y^*(1))$$

It can be seen from the above formula (3) that the power corresponding to the near-end digital voice signal y(n) is calculated according to the frequency domain signal corresponding to the near-end digital voice signal y(n) and the first smoothing parameter, the power corresponding to the far-end digital voice signal x(n) is calculated according to the frequency domain signal corresponding to the far-end digital voice signal x(n) and the second smoothing parameter, and the associated power between the near-end digital voice signal y(n) and the far-end digital voice signal x(n) is determined according to the near-end digital voice signal y(n), the far-end digital voice signal x(n) and the third smoothing parameter.

S258, echo detection

In this embodiment, step S258 is specifically: the voice activity detection module detects whether an echo digital voice signal d(n) is present in the near-end digital voice signal y(n) according to the power of the frequency domain signal corresponding to the overlap-stored i-th frame and (i−1)th frame of the far-end digital voice signal x(n), and the power of the frequency domain signal corresponding to the overlap-stored i-th frame and (i−1)th frame of the near-end digital voice signal y(n);

If present, S268 is executed, or else the process skips to steps S218A and S218B to obtain a (i+1)th frame of the far-end digital voice signal x(n) and a (i+1)th frame of the near-end digital voice signal y(n), the (i+1)th frame and i-th frame of the far-end digital voice signal x(n) are overlap-stored in the time domain in S228A, and the (i+1)th frame and i-th frame of the near-end digital voice signal y(n) are overlap-stored in the time domain in S228B;

In this embodiment, as mentioned above, if it is detected based on the energy method whether the echo digital voice signal d(n) is present in the near-end digital voice signal y(n), the power of the frequency domain signal corresponding to the overlap-stored i-th frame and (i−1)th frame of the far-end digital voice signal x(n), and the power of the frequency domain signal corresponding to the overlap-stored i-th frame and (i−1)th frame of the near-end digital voice signal y(n), are compared with corresponding power thresholds, respectively. If the power of the frequency domain signal corresponding to the overlap-stored i-th frame and (i−1)th frame of the far-end digital voice signal x(n), and the power of the frequency domain signal corresponding to the overlap-stored i-th frame and (i−1)th frame of the near-end digital voice signal y(n), are respectively greater than the corresponding power thresholds, it is determined that the echo digital voice signal d(n) is present in the near-end digital voice signal y(n).

S268, double talk detection

In this embodiment, step S268 is specifically: the double talk detector is activated to determine whether a near-end speaker's digital voice signal s(n) is present in the near-end digital voice signal y(n).

In this embodiment, an exemplary technical description of step S268 is shown in FIG. 3 below.

Figure 4:
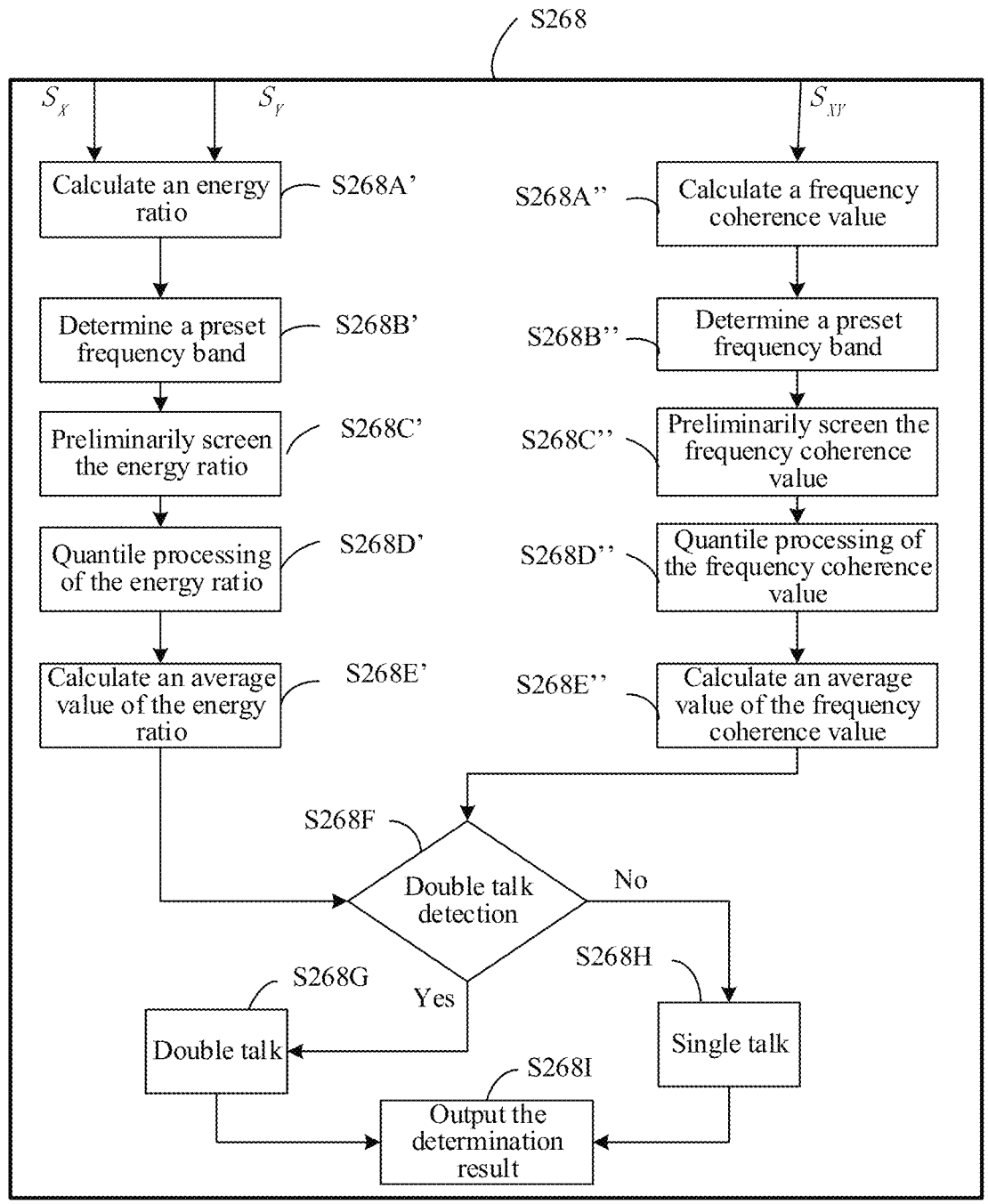
FIG. 4 is a schematic flowchart of double talk detection by a double talk detection apparatus according to Embodiment 4 of the present disclosure.

FIG. 4 is a schematic flowchart of double talk detection by a double talk detection apparatus according to Embodiment 4 of the present disclosure. As shown in FIG. 4, the process includes the following steps S268A'-S268I.

S268A', calculation of an energy ratio

In this embodiment, step S268A' is specifically: an energy ratio calculation module in the double talk detector determines the energy ratio according to the power of the frequency domain signal corresponding to the overlap-stored i-th frame and (i−1)th frame of the far-end digital voice signal x(n) and the power of the frequency domain signal corresponding to the overlap-stored i-th frame and (i−1)th frame of the near-end digital voice signal y(n);

In this embodiment, the energy ratio is specifically calculated using the following formula (4):

$$\rho_{X_iY_i} = S_{X_i}/(S_{Y_i} + \delta) \quad (4)$$

In the formula (4), the energy ratio is denoted as $\rho_{X_iY_i}$, and $\delta$ is a control factor for the calculation of the energy ratio, which avoids an infinite denominator caused by the fact that $S_{Y_i}$ in the formula (4) is 0. Generally, the value of $\delta$ is smaller than that of $S_{Y_i}$.

It can be seen from the above formula that the energy ratio is directly proportional to the power of the frequency domain signal corresponding to the overlap-stored i-th frame and (i−1)th frame of the far-end digital voice signal x(n), and inversely proportional to the power of the frequency domain signal corresponding to the overlap-stored i-th frame and (i−1)th frame of the near-end digital voice signal y(n).

In this embodiment, the energy ratio is specifically determined by the energy ratio calculation module. However, in fact, the technical processing for determining the energy ratio can also be integrated onto other module, and it is not necessary to add an energy ratio calculation module.

S268B', determination of a preset frequency band

In this embodiment, step S268B' is specifically: the energy ratio calculation module in the double talk detector determines the preset frequency band according to the frequency of the near-end speaker's digital voice signal s(n);

S268C', preliminary screening of the energy ratio

In this embodiment, step S268C' is specifically: the energy ratio calculation module determines the energy ratio between the frequency domain signals corresponding to the overlap-stored i-th frames and (i−1)th frames of the near-end digital voice signal y(n) and the far-end digital voice signal x(n) within the preset frequency band;

In this embodiment, in order to further avoid missing detection and false detection, the preset frequency band is set according to the frequency of the near-end speaker's digital voice signal s(n) and some of the energy ratios calculated in step S268A' are screened, for example, the frequency range of human digital voice signals is generally 300 to 3400 Hz, so the energy ratio is screened through the following formula (5).

$$\{n_0, n_1\} = \left\lfloor \{f_L, f_H\} \frac{2M}{f_s} \right\rfloor \quad (5)$$

In formula (5), $f_L$ represents a lower limit of the frequency, $f_H$ represents an upper limit of the frequency, and $f_s$ is a sampling frequency of each digital voice signal. For the i-th frames of the near-end digital voice signal y(n) and the far-end digital voice signal x(n), $n_0$ represents a frequency point corresponding to the lower limit of the frequency of the near-end speaker's digital voice signal s(n) in the frequency domain, and $n_1$ represents a frequency point corresponding to the upper limit of the frequency of the near-end speaker's digital voice signal s(n) in the frequency domain. Here, it should be noted that since the frequency points corresponding to the upper and lower limits of the frequency respectively in the frequency domain are determined, a plurality of frequency domain signals correspond to the i-th frames of the near-end digital voice signal y(n) and the far-end digital voice signal x(n) respectively, then a plurality of energy ratios are correspondingly obtained, and the frequency points corresponding to the upper and lower limits of the frequency respectively in the frequency domain define the position of the energy ratio screened according to the frequency among the plurality of energy ratios.

Specifically, if the frequency range of human digital voice signals is generally 300 to 3400 Hz, 300 Hz is determined as the lower limit of the frequency, the lower limit of the frequency has a corresponding frequency point $n_0$ in the frequency domain, 3400 Hz is determined as the upper limit of the frequency, and the upper limit of the frequency has a corresponding frequency point $n_1$ in the frequency domain.

S268D', quantile processing of the energy ratio

In this embodiment, step S268D' is specifically: the energy ratio calculation module performs quantile processing on the energy ratio between the frequency domain signals corresponding to the near-end digital voice signal y(n) and the far-end digital voice signal x(n) respectively within the preset frequency band;

In this embodiment, in order to prevent missing detection and false detection caused by weak voice signals at the beginning and end of a voice talk, quantile processing is performed. The energy ratios screened according to the frequencies in step S268C' are sorted from small to large, and some of them are further screened for double talk detection. Specifically, quartile processing can be used, the first quantile is 0.25, the second quantile is 0.5, the third quantile is 0.75, and the fourth quantile is 1, then the energy ratio between the second quantile 0.5 and the third quantile 0.75 is selected, that is, the energy ratio after quantile processing, or also referred to as the judgment quantity after quantile processing, is obtained as an effective energy ratio, and the detailed calculation is shown in formula (6).

$$\{n_L, n_H\} = \lfloor n_0 + \{0.5, 0.75\}(n_1 - n_0 + 1) \rfloor \quad (6)$$

In formula (6), 0.5 and 0.75 represent the second quantile and the third quantile respectively, $n_L$ represents the frequency point corresponding to the lower limit of the above-mentioned frequency after quantile processing in the frequency domain, $n_H$ represents the frequency point corresponding to the upper limit of the above-mentioned frequency after quantile processing in the frequency domain, and the frequency points corresponding to the upper limit and lower limit of the above-mentioned frequency respectively after quantile processing in the frequency domain define some of the energy ratios screened after the quantile processing, denoted as $\rho'_{X_iY_i}$.

Here, the quartiles can also be sorted from small to large. In addition, the energy ratio between the first quantile and the third quantile can also be selected. In fact, the specific choice of the energy ratio between two or more quantiles can be flexibly determined according to the needs of application scenarios.

In other embodiments, other specific quantile processing can also be used, and details are not repeated herein again.

S268E', calculation of an average value of the energy ratio;

In this embodiment, step S268E' is specifically: the energy ratio calculation module determines the average value of the energy ratio after the quantile processing;

Further, in this embodiment, in order to increase the accuracy of double talk detection, the average value of the energy ratio after the quantile processing is calculated through step S268', as detailed in the following formula (7).

$$\overline{\rho}_{X_i Y_i} = \frac{1}{n_H - n_L + 1} \sum_{n=n_L}^{n_H} \rho'_{X_i Y_i} \quad (7)$$

In the above formula (7), the average value of the energy ratio is denoted as $\overline{\rho}_{X_i Y_i}$, $n_H - n_L + 1$ represent the number of frequency points at which the energy ratios after the quantile processing are located, and the meanings of other parameters are referred to the foregoing description.

S268A", calculation of a frequency coherence value

In this embodiment, step S268A" is specifically: a coherence calculation module in the double talk detector determines the frequency coherence value between the near-end digital voice signal y(n) and the far-end digital voice signals x(n) according to the power corresponding to the near-end digital voice signal y(n) and power corresponding to the far-end digital voice signals x(n) and the associated power between the near-end digital voice signal y(n) and the far-end digital voice signals x(n).

In this embodiment, the frequency coherence value in step S268A" is calculated according to the following formula (8).

$$c_{X_i Y_i} = \frac{S_{X_i Y_i} \circ S^*_{X_i Y_i}}{S_{X_i} \circ S_{Y_i}} \quad (8)$$

In formula (8), "∘" represents a product of matrix elements, and "*" represents a complex conjugate.

It can be seen from the above formula (8) that the frequency coherence value is directly proportional to the associated power between the frequency domain signals corresponding to the overlap-stored i-th frames and (i−1)th frames of the near-end digital voice signal y(n) and the far-end digital voice signal x(n), and inversely proportional to the power corresponding to the frequency domain signals corresponding to the overlap-stored i-th frames and (i−1)th frames of the near-end digital voice signal y(n) and the far-end digital voice signal x(n).

Of course, in other embodiments, if it is only a rough estimate, the double talk detector is further configured to determine the frequency coherence value between the near-end digital voice signal y(n) and the far-end digital voice signal x(n) according to the power corresponding to the near-end digital voice signal y(n) and the power corresponding to the far-end digital voice signal x(n).

S268B", determination of a preset frequency band

In this embodiment, step S268B" is specifically: the double talk detector is further configured to determine the preset frequency band according to the frequency of the near-end speaker's digital voice signal s(n);

S268C", preliminary screening of the frequency coherence value

In this embodiment, step S268C" is specifically: the frequency coherence value between the frequency domain signals corresponding to the overlap-stored i-th frames and (i−1)th frames of the near-end digital voice signal y(n) and the far-end digital voice signal x(n) within the preset frequency band is determined;

In this embodiment, relevant descriptions of the frequency are referred to the descriptions of the above steps SS268B' and S268C' to obtain a frequency point corresponding to the lower limit of the frequency in the frequency domain, and a frequency point corresponding to the upper limit of the frequency in the frequency domain. Here, it should be noted that since the frequency points corresponding to the upper limit and lower limit of the frequency respectively in the frequency domain are determined, there are a plurality of frequency domain signals corresponding to the overlap-stored i-th frames and (i−1)th frames of the near-end digital voice signal y(n) and the far-end digital voice signal x(n) respectively, then a plurality of frequency coherence values are correspondingly obtained, and the frequency points corresponding to the upper and lower limits of the frequency respectively in the frequency domain define the position of the frequency coherence value screened according to the frequency among the plurality of frequency coherence values.

S268D", quantile processing of the frequency coherence value

In this embodiment, step S268D" is specifically: quantile processing is performed on the frequency coherence value between the frequency domain signals corresponding to the near-end digital voice signal y(n) and the far-end digital voice signal x(n) respectively within the preset frequency band;

Here, similar to the above step S268', the purpose of quantile processing is also to further avoid missing detection and false detection. The specific quantile processing is also quartile processing, so as to obtain a frequency point $n_L$ corresponding to the lower limit of the frequency in the frequency domain and a frequency point $n_H$ corresponding to the lower limit of the frequency in the frequency domain after the quantile processing. The frequency points corresponding to the upper and lower limits of the frequency respectively in the frequency domain after the quantile processing define some of the frequency coherence values after the quantile processing, denoted as $c'_{X_i Y_i}$.

S268E", calculation of an average value of the frequency coherence value;

In this embodiment, step S268E" is specifically: the average value of the frequency coherence value after the quantile processing is determined;

In this embodiment, the average value of the frequency coherence value after the quantile processing is specifically calculated as shown in formula (9).

$$\overline{c}_{X_i Y_i} = \frac{1}{n_H - n_L + 1} \sum_{n=n_L}^{n_H} c'_{X_i Y_i} \quad (9)$$

The average value of the frequency coherence value after the quantile processing is denoted as $\overline{c}_{X_i Y_i}$, and the meanings of other parameters are referred to the foregoing description.

S268F, double talk detection

In this embodiment, step S268 is specifically: whether the near-end speaker's digital voice signal s(n) is present in the i-th frame of the near-end digital voice signal y(n) is determined according to the result of comparing the average value of the energy ratio after the quantile processing with an energy threshold, and the result of comparing the average value of the frequency coherence value after the quantile processing with a coherence value threshold;

If the average value of the energy ratio after the quantile processing is greater than the energy threshold, or if the average value of the energy ratio after the quantile processing is smaller than the energy threshold and the average value of the frequency coherence value after the quantile processing is smaller than the coherence value threshold, step S268G is executed, or else S268H is executed.

In this embodiment, whether the near-end speaker's digital voice signal s(n) is present is specifically determined through the following formula (10).

$$DTD = \begin{cases} 1 & \text{if } \overline{p}_{X_iY_i} > \rho_T \text{ or } (\overline{p}_{X_iY_i} < \rho_T \text{ and } \overline{c}_{X_iY_i} < c_T) \\ 0 & \text{other cases} \end{cases} \quad (10)$$

In formula (10), the energy threshold is denoted as $\rho_T$, the coherence value threshold is denoted as $c_T$, and DTD is a variable representing the determination result. If the average value of the energy ratio after the quantile processing is greater than the energy threshold, or if the average value of the energy ratio after the quantile processing is smaller than the energy threshold and the average value of the frequency coherence value after the quantile processing is smaller than the coherence value threshold, the value of DTD is 1; and in other cases, the value of DTD is 0.

S268G, double talk;

In this embodiment, step S268G is specifically: the double talk detector determines that the near-end speaker's digital voice signal s(n) is present in the near-end digital voice signal y(n);

As mentioned above, if the value of DTD is 1, it is determined that the near-end speaker's digital voice signal s(n) is present in the near-end digital voice signal y(n), which is a double talk state;

S268H, single talk;

In this embodiment, step S268H is specifically: the double talk detector determines that the near-end speaker's digital voice signal s(n) is not present in the near-end digital voice signal y(n);

As mentioned above, if the value of DTD is 0, it is determined that the near-end speaker's digital voice signal s(n) is not present in the near-end digital voice signal y(n), which is a single talk state.

S268I, output of the determination result

In this embodiment, the determination result in step S268I is either a double talk state or a single talk state, and the update of the filter coefficient is controlled according to different determination results, so that the adaptive filter generates an estimated echo digital voice signal d̂(n) according to the filter coefficient and the far-end digital voice signal x(n) to cancel the echo digital voice signal d(n) present in the near-end digital voice signal y(n).

It should be noted that in this embodiment, the preset frequency band is determined according to the frequency of the near-end speaker's digital voice signal s(n), but this is not a unique limitation. In fact, according to the application scenario of the double talk detection scheme, the preset frequency band can be determined based on the needs of the scenario, and then the energy ratio and frequency coherence value can be screened.

In addition, in this embodiment, the energy ratio and the frequency coherence value are further specifically screened by the quantile processing from the plurality of energy ratios and frequency coherence values screened according to the preset frequency band, but this is not a unique limitation. In fact, according to the application scenario of the double talk detection scheme, the energy ratio and the frequency coherence value can be further screened based on the needs of the scenario from the plurality of energy ratios and frequency coherence values screened according to the preset frequency band.

Furthermore, in this embodiment, the method of specifically determining whether the near-end speaker's digital voice signal s(n) is present in the near-end digital voice signal y(n) is not a unique limitation. In fact, according to the application scenario of the double talk detection scheme, a more accurate determination method can be set based on the needs of the scenario.

In the above-mentioned embodiments, implementation in the frequency domain is mainly used as an example for description. However, inspired by the above-mentioned embodiments, those of ordinary skill in the art can also implement in the time domain without departing from the idea of the present disclosure.

In addition, the specific formulas described in the above-mentioned embodiments are merely examples but not uniquely limited, and those of ordinary skill in the art can modify them without departing from the idea of the present disclosure.

Moreover, in the above-mentioned embodiments, it is necessary to determine the energy ratio between the far-end digital voice signal and the near-end digital voice signal, and the frequency coherence value between the near-end digital voice signal and the far-end digital voice signal as an example. However, for those of ordinary skill in the art, if the energy ratio and the frequency coherence value have been determined when the scheme is executed, the determination of the energy ratio and the frequency coherence value can be directly omitted. If the energy ratio and the frequency coherence value need to be determined, the above-mentioned embodiments are exemplified by determining the energy ratio between the far-end digital voice signal and the near-end digital voice signal according to the power corresponding to the far-end digital voice signal and the power corresponding to the near-end digital voice signal, and the frequency coherence value between the near-end digital voice signal and the far-end digital voice signal. The power can be obtained from power spectra as an example. In fact, for those of ordinary skill in the art, the obtaining of the power from the power spectra is only an example from the overall technical solution, and alternatively, the power can also be obtained by look-up.

The foregoing technical solutions of the embodiments of the present disclosure can be specifically used in various types of electronic devices, and the electronic devices exist in various forms, including but not limited to:

(1) A mobile communication device: This type of device has a mobile communication function, and has a main goal of providing voice and data communication. This type of terminal includes: a smart phone (such as iPhone), a multimedia phone, a functional phone, a low-end phone, etc.

(2) An ultra-mobile personal computer device: This type of device belongs to the category of personal computers, has computing and processing functions, and generally has mobile Internet access characteristics. This type of terminal includes: PDA, MID and UMPC devices, such as iPad.

(3) A portable entertainment device: This type of device can display and play multimedia contents. This type of device includes: an audio and video player (such as iPod), a hand-held game console, an e-book, as well as an intelligent toy and a portable vehicle navigation device.

(4) Other electronic devices with data interaction functions.

So far, specific embodiments of the present subject matter have been described. Other embodiments fall within the scope of the appended claims. In some cases, the operations described in the claims may be performed in a different order and still achieve the desired results. In addition, the processes described in the drawings do not necessarily require a particular order shown or a sequential order to achieve the desired results. In some embodiments, multitasking and parallel processing may be advantageous.

The systems, apparatuses, modules or units illustrated in the above embodiments may be implemented by a computer chip, an entity, or a product having certain function. A typical implementation device is a computer. Specifically, the computer may be, for example, a personal computer, a laptop computer, a cellular phone, a camera phone, a smart phone, a personal digital assistant, a media player, a navigation device, an E-mail device, a game console, a tablet computer, a wearable device, or a combination of any of these devices.

For the convenience of description, when the above apparatus is described, the functions may be described by various units respectively. Of course, when the present disclosure is implemented, the functions of respective units may be implemented in the same or more software and/or hardware.

A person skilled in the art should understand that the embodiments of the present disclosure may be provided as a method, a system, or a computer program product. Therefore, the present disclosure may be in the form of a full hardware embodiment, a full software embodiment, or an embodiment combining software and hardware. In addition, the present disclosure may be in the form of a computer program product implemented on one or more computer available storage media (including but not limited to a disk memory, a CD-ROM, an optical memory, etc.) including computer available program codes.

The present disclosure is described with reference to flowcharts and/or block diagrams of the method, device (system), and the computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of other programmable data processing device to generate a machine, so that a device configured to implement functions specified in one or more processes in the flowcharts and/or one or more blocks in the block diagrams is generated by using instructions executed by the general-purpose computer or the processor of other programmable data processing device.

These computer program instructions may also be stored in a computer-readable memory that can guide a computer or other programmable data processing device to work in a specific manner, so that the instructions stored in the computer-readable memory generate a product including an instruction device, where the instruction device implements functions specified in one or more processes in the flowcharts and/or one or more blocks in the block diagrams.

These computer program instructions may also be loaded into a computer or other programmable data processing device, so that a series of operation steps are performed on the computer or other programmable data processing device to generate processing implemented by a computer, and instructions executed on the computer or other programmable data processing device provide steps for implementing functions specified in one or more processes in the flowcharts and/or one or more blocks in the block diagrams.

It should be noted that the terms "include", "comprise", or any variants thereof are intended to cover a non-exclusive inclusion. Accordingly, a process, method, commodity, or device including a series of elements not only includes these elements, but also includes other elements not definitely listed, or may include inherent elements of the process, method, commodity, or device. In the absence of more limitations, an element limited by "include a . . . " does not exclude other same elements existing in the process, method, commodity, or device including the element.

A person skilled in the art should understand that the embodiments of the present disclosure may be provided as a method, a system, or a computer program product. Therefore, the present disclosure may be in the form of a full hardware embodiment, a full software embodiment, or an embodiment combining software and hardware. In addition, the present disclosure may be in the form of a computer program product implemented on one or more computer available storage media (including but not limited to a disk memory, a CD-ROM, an optical memory, etc.) including computer available program codes.

The present disclosure may be described in a general context of a computer executable instruction executed by the computer, for example, a program module. Generally, the program module includes a routine, a program, an object, a component, a data structure, and the like for performing a specific task or implementing a specific abstract data type. The present disclosure may also be practiced in distributed computing environments. In these distributed computing environments, a task is performed by a remote processing device connected by a communications network. In the distributed computing environments, the program module may be in local and remote computer storage media that include a storage device.

Described above are merely embodiments of the present disclosure, and the present disclosure is not limited thereto. Various modifications and variations may be made to the present disclosure for those skilled in the art. Any modification, equivalent substitution, improvement or the like made within the spirit and principle of the present disclosure shall fall into the scope of the claims of the present disclosure.

What is claimed is:

1. A double talk detection method, applied to a first terminal device, comprising:
 determining, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal, wherein the far-end digital voice signal is received by the first terminal device from a second terminal device that is in voice communication with the first terminal device, the near-end digital voice signal is acquired by a microphone of the first terminal device, and the near-end speaker's digital voice signal is obtained by the microphone of the first terminal device when a speaker at the first terminal device speaks.

2. The double talk detection method according to claim 1, further comprising: determining the energy ratio between the far-end digital voice signal and the near-end digital voice signal, and the frequency coherence value between the near-end digital voice signal and the far-end digital voice signal.

3. The double talk detection method according to claim 2, wherein the determining the energy ratio between the far-end digital voice signal and the near-end digital voice signal, and the frequency coherence value between the near-end digital voice signal and the far-end digital voice signal comprises: determining, according to power corresponding to the far-end digital voice signal and power corresponding to the near-end digital voice signal, the energy ratio between the far-end digital voice signal and the near-end digital voice signal, and the frequency coherence value between the near-end digital voice signal and the far-end digital voice signal, respectively.

4. The double talk detection method according to claim 3, wherein the determining, according to power corresponding to the far-end digital voice signal and power corresponding to the near-end digital voice signal, the frequency coherence value between the near-end digital voice signal and the far-end digital voice signal comprises: determining, according to the power corresponding to the near-end digital voice signal, the power corresponding to the far-end digital voice signal, and associated power between the near-end digital voice signal and the far-end digital voice signal, the frequency coherence value between the near-end digital voice signal and the far-end digital voice signal.

5. The double talk detection method according to claim 4, further comprising: determining the associated power between the near-end digital voice signal and the far-end digital voice signal according to the near-end digital voice signal, the far-end digital voice signal and a third smoothing parameter.

6. The double talk detection method according to claim 1, further comprising: detecting, according to power corresponding to the far-end digital voice signal and power corresponding to the near-end digital voice signal, whether an echo digital voice signal is present in the near-end digital voice signal, and determining whether the near-end speaker's digital voice signal is present in the near-end digital voice signal when the echo digital voice signal is present in the near-end digital voice signal, wherein the echo digital voice signal is generated when the far-end digital voice signal is played via a loudspeaker of the first terminal device.

7. The double talk detection method according to claim 1, further comprising: calculating power corresponding to the near-end digital voice signal according to a frequency domain signal corresponding to the near-end digital voice signal, and calculating power corresponding to the far-end digital voice signal according to a frequency domain signal corresponding to the far-end digital voice signal.

8. The double talk detection method according to claim 7, wherein the calculating power corresponding to the near-end digital voice signal according to a frequency domain signal corresponding to the near-end digital voice signal comprises: calculating the power corresponding to the near-end digital voice signal according to the frequency domain signal corresponding to the near-end digital voice signal and a first smoothing parameter; and the calculating power corresponding to the far-end digital voice signal according to a frequency domain signal corresponding to the far-end digital voice signal comprises: calculating the power corresponding to the far-end digital voice signal according to the frequency domain signal corresponding to the far-end digital voice signal and a second smoothing parameter.

9. The double talk detection method according to claim 1, wherein the determining, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal comprises: determining, according to the energy ratio between the near-end digital voice signal and the far-end digital voice signal within a preset frequency band, and the frequency coherence value between the near-end digital voice signal and the far-end digital voice signal within the preset frequency band, whether the near-end speaker's digital voice signal is present in the near-end digital voice signal.

10. The double talk detection method according to claim 9, further comprising: determining the preset frequency band according to a frequency of the near-end speaker's digital voice signal.

11. The double talk detection method according to claim 9, further comprising: performing quantile processing on the energy ratio and the frequency coherence value between the near-end digital voice signal and the far-end digital voice signal within the preset frequency band, so as to determine whether the near-end speaker's digital voice signal is present in the near-end digital voice signal according to the energy ratio after the quantile processing and the frequency coherence value after the quantile processing.

12. The double talk detection method according to claim 11, further comprising: determining an average value of the energy ratio after the quantile processing and an average value of the frequency coherence value after the quantile processing, so as to determine, according to the average value of the energy ratio after the quantile processing and the average value of the frequency coherence value after the quantile processing, whether the near-end speaker's digital voice signal is present in the near-end digital voice signal.

13. The double talk detection method according to claim 12, wherein the determining, according to the average value of the energy ratio after the quantile processing and the average value of the frequency coherence value after the quantile processing, whether the near-end speaker's digital voice signal is present in the near-end digital voice signal comprises: determining, according to a result of comparing the average value of the energy ratio after the quantile processing with an energy threshold, and a result of comparing the average value of the frequency coherence value after the quantile processing with a coherence value threshold, whether the near-end speaker's digital voice signal is present in the near-end digital voice signal.

14. A double talk detection apparatus, applied to a first terminal device, comprising: a double talk detector configured to: determine, according to an energy ratio between a far-end digital voice signal and a near-end digital voice signal, and a frequency coherence value between the near-end digital voice signal and the far-end digital voice signal, whether a near-end speaker's digital voice signal is present in the near-end digital voice signal, wherein the far-end digital voice signal is received by the first terminal device from a second terminal device that is in voice communication with the first terminal device, the near-end digital voice signal is acquired by a microphone of the first terminal device, and the near-end speaker's digital voice signal is obtained by the microphone of the first terminal device when a speaker at the first terminal device speaks.

15. The double talk detection apparatus according to claim 14, wherein the double talk detector is further configured to determine the energy ratio between the far-end digital voice signal and the near-end digital voice signal, and the frequency coherence value between the near-end digital voice signal and the far-end digital voice signal.

16. The double talk detection apparatus according to claim 15, wherein the double talk detector is further configured to determine, according to power corresponding to the far-end digital voice signal and power corresponding to the near-end digital voice signal, the energy ratio between the far-end digital voice signal and the near-end digital voice signal, and the frequency coherence value between the near-end digital voice signal and the far-end digital voice signal, respectively.

17. The double talk detection apparatus according to claim 14, further comprising: a voice activity detection module configured to detect, according to power corresponding to the far-end digital voice signal and power corresponding to the near-end digital voice signal, whether an echo digital voice signal is present in the near-end digital voice signal, wherein the double talk detector determines whether the near-end speaker's digital voice signal is present in the near-end digital voice signal when the echo digital voice signal is present in the near-end digital voice signal, wherein the echo digital voice signal is generated when the far-end digital voice signal is played via a loudspeaker of the first terminal device.

18. The double talk detection apparatus according to claim 14, wherein the double talk detector comprises an energy ratio calculation module, configured to determine the energy ratio according to power corresponding to the far-end digital voice signal and power corresponding to the near-end digital voice signal, the double talk detector is further configured to determine, according to power corresponding to the near-end digital voice signal, power corresponding to the far-end digital voice signal, and associated power between the near-end digital voice signal and the far-end digital voice signal, the frequency coherence value between the near-end digital voice signal and the far-end digital voice signal.

19. The double talk detection apparatus according to claim 14, wherein the double talk detector is further configured to determine, according to the near-end digital voice signal and the far-end digital voice signal, the associated power between the near-end digital voice signal and the far-end digital voice signal.

20. An echo cancellation system, comprising a double talk detection apparatus and an adaptive filter, wherein the double talk detection apparatus comprises a double talk detector configured to: determine, according to an energy ratio between a far-end digital voice signal and a near-end digital voice signal, and a frequency coherence value between the near-end digital voice signal and the far-end digital voice signal whether a near-end speaker's digital voice signal is present in the near-end digital voice signal, wherein the far-end digital voice signal is received by the first terminal device from a second terminal device that is in voice communication with the first terminal device, the near-end digital voice signal is acquired by a microphone of the first terminal device, and the near-end speaker's digital voice signal is obtained by the microphone of the first terminal device when a speaker at the first terminal device speaks.

* * * * *